US011295778B1

(12) United States Patent
Aung et al.

(10) Patent No.: US 11,295,778 B1
(45) Date of Patent: Apr. 5, 2022

(54) RESOURCE ALLOCATION FOR MULTI-ACTUATOR STORAGE DEVICE

(71) Applicant: Seagate Technology LLC, Fremont, CA (US)

(72) Inventors: Thaik Thaik Aung, Singapore (SG); Xin Li, Singapore (SG); Jeetandra Kella, Singapore (SG); Wajid Ali, Singapore (SG); Jun Cai, Singapore (SG); JianZhong Zhang, Edina, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/093,746

(22) Filed: Nov. 10, 2020

(51) Int. Cl.
*G11B 5/55* (2006.01)
*G11B 20/12* (2006.01)
*G11B 20/10* (2006.01)
*G11B 5/012* (2006.01)

(52) U.S. Cl.
CPC ........ *G11B 20/10481* (2013.01); *G11B 5/012* (2013.01)

(58) Field of Classification Search
CPC ............ G11B 5/5578; G11B 2020/234; G11B 2020/292; G11B 5/012; G11B 5/02; G11B 2020/1217; G11B 2020/1218; G11B 2020/1224; G11B 2020/1232; G11B 2020/1292; G11B 5/09
USPC .......................... 360/55, 75, 69, 78.04, 78.12
See application file for complete search history.

(56) References Cited

U.S. PATENT DOCUMENTS

| 6,490,138 | B1 | 12/2002 | Prater |
| 6,560,075 | B2 | 5/2003 | Price et al. |
| 6,603,640 | B1 | 8/2003 | Prater et al. |
| 6,847,504 | B1 | 1/2005 | Bennett et al. |
| 9,830,939 | B1 * | 11/2017 | Hamilton ................ G06F 3/064 |
| 9,911,442 | B1 | 3/2018 | Kharisov et al. |
| 10,037,779 | B1 | 7/2018 | Mendonsa et al. |
| 10,043,543 | B1 | 8/2018 | Buch et al. |
| 10,049,691 | B1 | 8/2018 | Gaertner et al. |
| 10,096,332 | B1 | 10/2018 | Shen et al. |
| 10,157,631 | B2 | 12/2018 | Trantham et al. |
| 10,186,287 | B2 | 1/2019 | Keshavan et al. |
| 10,192,575 | B1 | 1/2019 | Resh |
| 10,192,576 | B1 | 1/2019 | Gaertner et al. |
| 10,249,339 | B1 | 4/2019 | Mendonsa et al. |
| 10,366,726 | B1 | 7/2019 | Granz et al. |
| 10,418,055 | B1 | 9/2019 | Yeom et al. |
| 10,418,056 | B1 | 9/2019 | Shen et al. |
| 10,424,328 | B1 | 9/2019 | Gaertner et al. |
| 10,431,246 | B2 | 10/2019 | Zhu et al. |
| 10,446,180 | B1 | 10/2019 | Kraus et al. |
| 10,482,911 | B1 | 11/2019 | Nanjunda Swamy |
| 10,504,545 | B1 | 12/2019 | Gaertner et al. |

(Continued)

*Primary Examiner* — Nabil Z Hindi
(74) *Attorney, Agent, or Firm* — Kirk A. Cesari

(57) ABSTRACT

Systems and methods are disclosed for resource allocation for multi-actuator systems. In some examples, a data storage device can include two or more independently moveable voice coil motor (VCM) actuators where the resources of the system to operate the VCM actuators are divided. The disclosure here describes methods to allocate or re-allocate the divided resources, such as unused resources, to a VCM actuator that has a need for more resources. The methods and systems herein can also be applied to other actuator systems.

19 Claims, 5 Drawing Sheets

(56) References Cited

U.S. PATENT DOCUMENTS

| | | |
|---|---|---|
| 10,510,373 B1 | 12/2019 | Granz et al. |
| 10,522,175 B1 | 12/2019 | Horgan |
| 10,547,264 B1 | 1/2020 | Buch |
| 10,593,358 B2 | 3/2020 | Kraus et al. |
| 10,706,886 B1 | 7/2020 | Parkash et al. |
| 10,720,200 B2 | 7/2020 | Dallmann et al. |
| 10,741,210 B1 | 8/2020 | Hillukka et al. |
| 10,783,910 B2 | 9/2020 | Zhu et al. |
| 2011/0286130 A1* | 11/2011 | Goldberg ............ G11B 5/5547 360/75 |
| 2018/0226091 A1 | 8/2018 | Tan et al. |

* cited by examiner

RESOURCE ALLOCATION FOR MULTI-ACTUATOR STORAGE DEVICE

SUMMARY

In certain embodiments, an apparatus may comprise a first VCM actuator, a second VCM actuator independently moveable from the first VCM actuator, and a control system coupled to the first VCM actuator and the second VCM actuator. The control system may be configured to monitor a first resource usage of the first VCM actuator, monitor a second resource usage of the second VCM actuator, provide an additional resource to a selected one of the first VCM actuator and the second VCM actuator based on the first resource usage and the second resource usage, and operate the selected VCM actuator utilizing the additional resource.

In certain embodiments, an apparatus may comprise a control circuit configured to be coupled to a first voice coil motor (VCM) actuator and a second VCM actuator. The control circuit may be configured to monitor a first resource usage of the first VCM actuator, monitor a second resource usage of the second VCM actuator, provide an additional resource to a selected one of the first VCM actuator and the second VCM actuator based on the first resource usage and the second resource usage, and operate the selected VCM actuator utilizing the additional resource.

In certain embodiments, a memory device stores instructions that when executed cause a processor to perform a method. The method may comprise monitoring a first resource usage of a first VCM actuator, monitoring a second resource usage of a second VCM actuator, providing an additional resource to a selected one of the first VCM actuator and the second VCM actuator based on the first resource usage and the second resource usage and operating the selected VCM actuator utilizing the additional resource.

DETAILED DESCRIPTION

Figure 1:
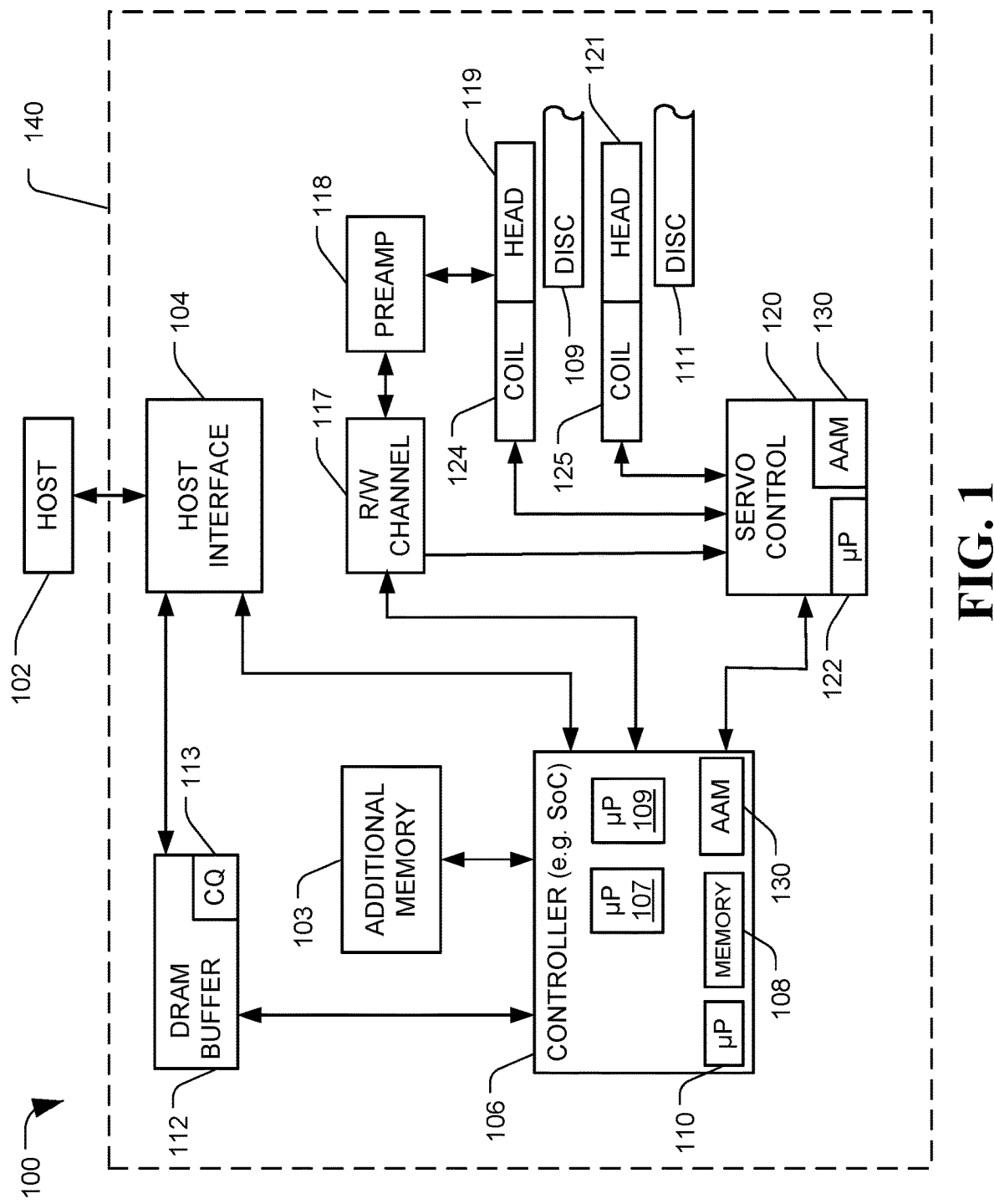
FIG. 1 is a diagram of a system of resource allocation for multi-actuator storage device, in accordance with certain embodiments of the present disclosure.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, system-on-chip (SoC), and other hardware devices can likewise be constructed to implement the circuits, functions, processes, and methods described herein. Methods and functions may be performed by modules or engines, both of which may include one or more physical components of a computing device (e.g., logic, circuits, processors, controllers, etc.) configured to perform a particular task or job, or may include instructions that, when executed, can cause a processor to perform a particular task or job, or may be any combination thereof. Further, the methods described herein may be implemented as a computer readable storage medium or memory device including instructions that, when executed, cause a processor to perform the methods.

Many multi-actuator systems need to share resources such as resources related to volatile memory, non-volatile memory, processor(s), and overall power consumption. There are two methods that can be implemented for sharing resources in a multi-actuator system. First, a system may implement un-controlled or greedy resource sharing where if the resources are mostly used up by one actuator due to the conditions that allow it (e.g proximal to the host electronically) then, another actuator may starve of resources and perform poorer in terms of input/output (I/O) performance.

Another method of resource sharing that can be implement is equal quota-based sharing where each actuator in the system is provided an allotted portion, or quota, of the resources that are dedicated for that specific actuator to utilize. While such a method can achieve better performance for concurrent workloads, the method performs poorer when there are unlike workloads running on more than one actuator (e.g., where one actuator is the sole user of a resource and another actuator does not need to use the same resource).

Thus, proposed herein is a third method that incorporates workload monitoring and a resource allocation algorithm to implement a hybrid between greedy resource sharing and quota-based resource sharing. This third method will allow improvement in the overall device performance as well as per actuator performance. Generally, in order to achieve this, the third method may include:
  (i) Starting off with a quota-based resource allocation for each actuator in a multi-actuator system;
  (ii) Maintaining a workload monitoring system that can advise which actuator is idle or not using all of a resource's quota; and
  (iii) Based on the advice from workload monitoring system, determining if a selected actuator that is busy should be given resources more than its quota (e.g., for a time quantum, such as in a pre-determined number of milliseconds).

In some embodiments, an actuator that is allowed to use resources more than its quota may use the resources within a predetermined amount of time (e.g. X milliseconds). If the actuator needs more time to use the resources, it can request to the workload advisor to let it use the resources for another amount of time (e.g., a 2nd amount of X milliseconds). If the workload advisor determines that another actuator needs back its resources, the actuator which is holding the other actuator resources may be interrupted or instructed to finish its work quickly to release the resources back. Detailed examples and embodiments of this third method are presented below with respect to FIGS. 1 through 4.

FIG. 1 shows a diagram of a system of resource allocation for a multi-actuator data storage device, generally designated 100, in accordance with certain embodiments of the present disclosure. System 100 may include a data storage device (DSD) 140 including a physical interface 104 configured to be coupled to a host computer device 102, which may be via intervening devices or via a direct connection. The DSD 140 may also be referred to as a hard disc drive (HDD) or disc data storage device, according to some embodiments. The DSD 140 can communicate with the host device 102 via the hardware and firmware-based interface circuit 104. The interface 104 may comprise any interface that allows communication between a host 102, such as receiving read or write operations from the host device 102, and a DSD 140 that can be either wired or wireless. For example, the interface 104 may be a communications interface that complies with a standard such as USB (universal serial bus), IEEE (Institute of Electrical and Electronics Engineers standard) 1394, Compact Flash, SATA (Serial Advanced Technology "AT" Attachment), eSATA (External SATA), PATA (Parallel AT Attachment), SCSI (Small Computer System Interface), SAS (Serial Attached SCSI), PCIe (Peripheral Component Interconnect Express), Fibre Channel, Ethernet, Thunderbolt, any variations thereof, or any combination thereof, as well as any other communications interface. The interface 104 may include a connector that allows the DSD 140 to be physically removed from the host 102. The DSD 140 may also have a casing housing the components of the DSD 140.

Further, the DSD 140 can include a buffer 112 that can temporarily store data during read and write operations and can include a command queue (CQ) 113 where multiple operations can be temporarily stored pending execution. Commands arriving over the interface 104 may automatically be received in the CQ 113 or may be stored there by controller 06, interface 104, or another component.

The DSD 140 can include a programmable controller 106, which can include associated memory 108 and processor 110. The controller may execute firmware (FW) (e.g. instructions stored to a memory, such as additional memory 103 or memory 108) to control the operations of the DSD 140, the processor 110, or both. The controller 106 may control data access operations, such as reads and writes, to one or more memories, such as disc memories 109 and 111, additional memory 103, or any combination thereof. For example, additional memory 103 may include volatile memory such as dynamic random access memory (DRAM) or static random access memory (SRAM), nonvolatile solid state memory such as NAND flash memory, read-only memory (ROM), other memory types, or any combination thereof. The additional memory 103 can function as a working memory for storing temporary data, a cache to store recently or frequently read or written data, or data likely to be read soon, or for other temporary data storage. Additional memory 103 may also function as main long-term storage instead of or in addition to discs 109 and 111. A DSD 140 containing multiple types of nonvolatile storage mediums, such as a disc(s) and flash, may be referred to as a hybrid storage device. The memory 108 may similarly include DRAM, SRAM, or similar volatile memory, and may store FW instructions that can be executed by the processor 110 to have the controller 106 perform operations.

The DSD 140 can include a read-write (R/W) channel 117, which can encode data during write operations and reconstruct user data retrieved from a memory, such as discs 109 or 111, during read operations. A preamplifier circuit (preamp) 118 can apply write currents to the head(s) 119 and can provide pre-amplification of read-back signals. Heads 119 and 121 may include a read element and a write element. A servo control circuit 120 may use servo data to provide the appropriate current to a voice coil motor (VCM) 124 or VCM 125 to move the heads 119 or 121 over a desired area of the discs 109 or 111 by moving an adjustable actuator on which the heads 119 or 121 are mounted. The servo control 120 may also control movement of additional actuators on an actuator arm, such as a first microactuator and a second microactuator. The controller 106 can communicate with a processor 122 of the servo control circuit 120 to move the heads 119 or 121 to the desired locations on the discs 109 or 111, respectively, during execution of various pending commands in the command queue 113.

The DSD 140 may include an actuator allocation module (AAM) 130. The AAM 130 may be a processor, controller, or other circuit, or it may be a set of software instructions that, when executed by a processing device, such as processor 110 or 122, perform the functions of the AAM 130. In some embodiments, the AAM 130 may be part of or executed by the controller 1206, part of the servo controller 120, incorporated into other elements of the DSD 140, a standalone component within the DSD 140, or any combination thereof. The AAM 130 may control operations of DSD 140 relating to utilization of resources available to the actuators of a multi-actuator servo system, as described herein. Examples of multi-actuator DSDs are provided in more detail in FIGS. 2A and 2B.

In some embodiments, a primary central processing unit (CPU, microprocessor, or processor), such as processor 110, may monitor workloads from the host 102 via host command queue(s) 113 and each actuator may have other processors, such as processors 107 and 109, that are associated with a specific actuator to help perform internal processes, like garbage collection, media cache cleaning, Directed Offline Scan quality checks, etc., especially those processes that are disc and actuator location specific. The processors 107 and 109 may send information to the AAM 130 regarding these additional workloads. In one example, a workload monitor within the AAM 130 can be implemented at the primary CPU 110 to monitor and solely determine resource distribution between the actuators; in another example, the other processors 107 and 109 could send requests to the primary CPU 110 for additional resources for the actuators they correspond to; and, in yet another example, a combination of the two resource management processing systems may be implemented.

Figure 2A:
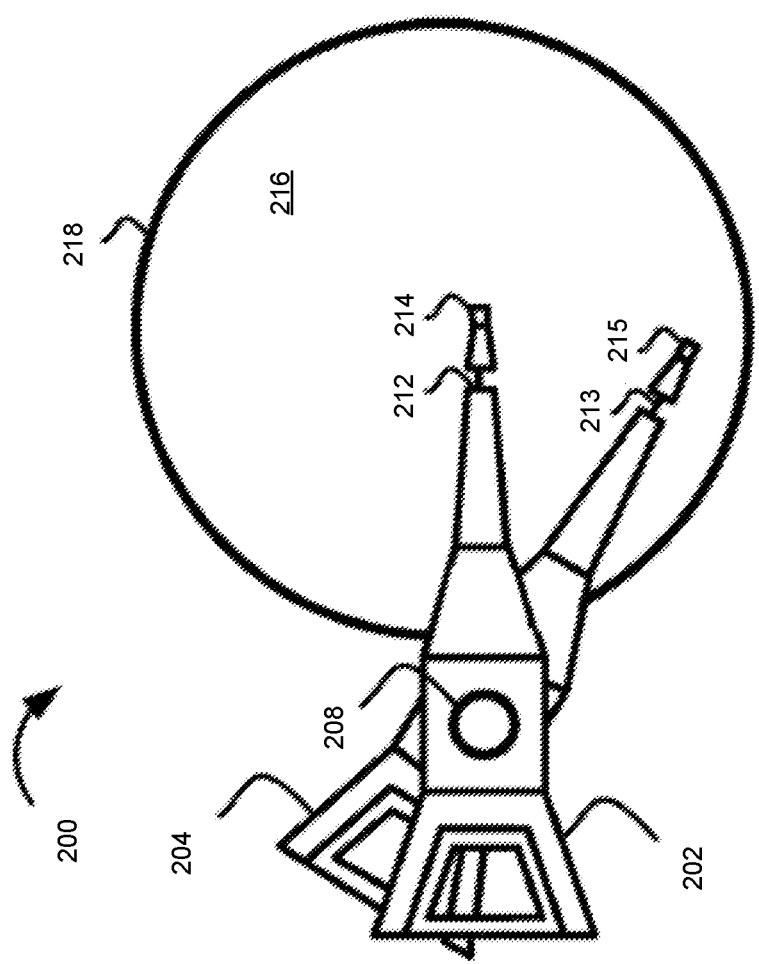
FIG. 2A is a diagram of a system of resource allocation for multi-actuator storage device, in accordance with certain embodiments of the present disclosure.
Figure 2B:
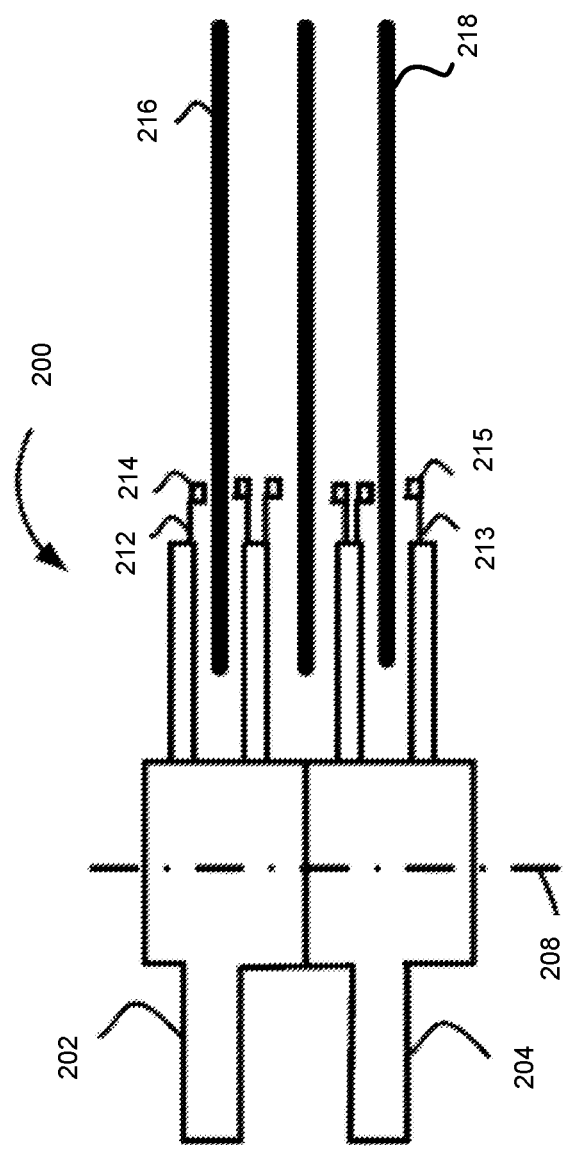
FIG. 2B is a diagram of a system of resource allocation for multi-actuator storage device, in accordance with certain embodiments of the present disclosure.

FIGS. 2A and 2B show diagrams of a system of resource allocation for a multi-actuator data storage device, generally designated 200, in accordance with certain embodiments of the present disclosure. FIG. 2A shows a top-down view of a portion of the multi-actuator DSD 200. FIG. 2B shows a cross-section, side view of the same multi-actuator DSD 200. System 200 may be a DSD that includes two or more independently moveable actuators, such as a first actuator 202 and a second actuator 204. The first actuator 202 may include a first microactuator 212 and a first read/write head 214, which in some embodiments may be the read/write head 119. The first VCM 124 can be coupled to the first actuator 202 and can be utilized to position the first actuator 202. The second actuator 204 may include a second microactuator 213 and a second read/write head 215, which in some embodiments may be the read/write head 121. The second VCM 125 can be coupled to the second actuator 204 and can be utilized to position the second actuator 204. In some embodiments, each actuator 202 and 204 and respective read/write head 214 and 215 have a separate read/write data path and control system, which may include a preamplifier, channel circuit, processor, and servo control, such that each actuator and read/write head can be operated independently.

In some embodiments, the first actuator 202 and the second actuator 204 are independently rotatable about a single axis (e.g., via a single or common shaft holding both actuators such that they are stacked vertically) 208 to position their respective read/write heads over a corresponding data storage disc 216 or 218. In some embodiments, data storage disc 216 is disc 109 and data storage disc 218 is disc 111. In further embodiments, there may be any number of additional read/write heads, discs, disc surfaces, or independently moveable actuators. In still further embodiments, at least one of the multiple actuators may have be on a separate axis and may not all be on a single axis.

The first actuator 202 and the second actuator 204 may have resources, such as volatile memory space, nonvolatile memory space (either solid state or disc based), processor (CPU) capacity, power, or others, of the DSD 200 utilized during performance of operations that are associated with a specific actuator arm. For example, resources used during the operations associated with the read/write head(s) of an actuator arm.

Figure 3:
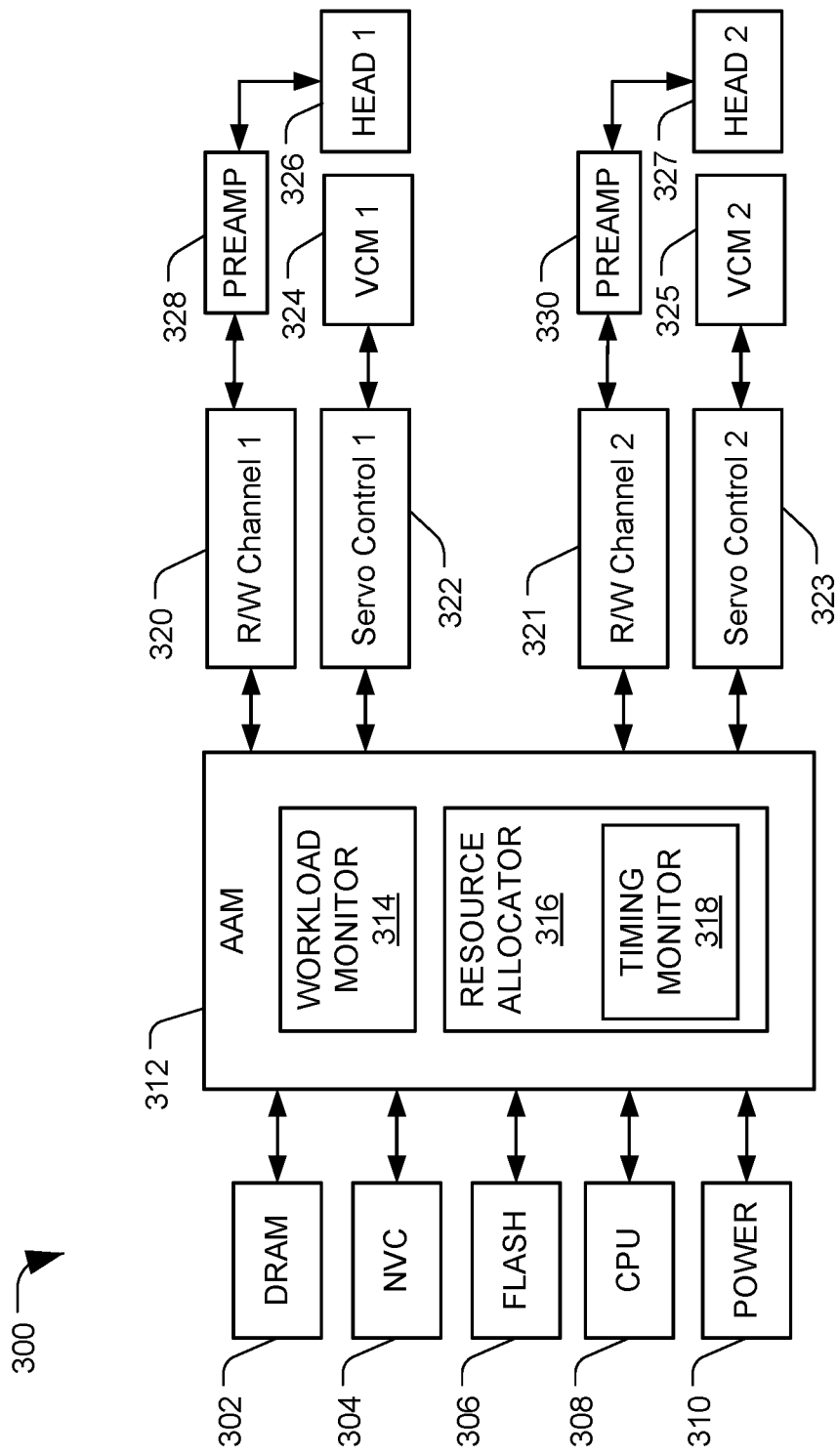
FIG. 3 is a diagram of a system of resource allocation for multi-actuator storage device, in accordance with certain embodiments of the present disclosure.

FIG. 3 show a diagram of a system of resource allocation for a multi-actuator data storage device, generally designated 300, in accordance with certain embodiments of the present disclosure. In some embodiments, FIG. 3 is a functional block diagram of systems 100 and 200. Resources that may be associated with an actuator during operation of the DSD 300 may include allocated DRAM memory space 302, allocated nonvolatile cache memory space (NVC) 304, allocated Flash memory space 306, processor (CPU) resources 308 (e.g. CPU cycles, number of cores available for use, number of processes that can be executed simultaneously, length or priority of a kernel scheduler, etc.), an amount of power 310, or any combination thereof. Further examples of resources that can be managed via the systems herein include CPU resource sharing, such as by giving more CPU processing time, processing power, and priority via a kernel scheduler/dispatcher as advised by the workload monitor 314.

The AAM 312 may monitor usage of one or more of the resources via a workload monitor module 314, which may include one or more sensors or inputs that allow the monitor module 314 to determine a level of usage of the resource. In some examples, the workload monitor module 314 can monitor a level of resource usage by measuring a current amount of DRAM allocated to pending writes, pattern of access of the incoming commands, or weighted time-average of consumed resources such as power-consumed per actuator, number of sectors accessed per actuator, or a combination thereof. The AAM 312 may also include a resource allocator module 316 that may determine when to allocate a resource from one actuator to a different actuator based on information from the resource monitor module 314. The resource allocator module 316 may utilize a timing monitor module 318 that can set a time period for a re-allocated resource. In some embodiments, AAM 312 (including resource monitor module 314, resource allocator module 316, timing monitor module 318) may be implemented as firmware that can be executed within the controller 110 or servo control circuit 120.

The AAM 312 may provide the resources to each actuator via separate control paths and data paths. For example, a first actuator, such as actuator 202, may have a first data path that generally includes a first read/write channel 320, a first preamplifier 328, and a first read/write head 326, as well as a first control path that includes a first servo control circuit 322 and a first VCM 324. A second actuator, such as actuator 204, may have a second data path that generally includes a second read/write channel 321, a second preamplifier 330, and a second read/write head 327, as well as a second control path that includes a second servo control 323 and a second VCM 325. In some embodiments, portions of the first read/write channel and the second read/write channel may utilize the same circuitry, such as in parallel operation. Further, some embodiments may include separate processors associated with each servo control 322 and 323. For example, each actuator can have a separate servo control that controls the separate VCMs and also includes a separate controller processor, which can communicate to each other via a low latency port for inter communications.

In further examples, the AAM 312 may implement (e.g., via firmware including instructions that cause operations to be executed at a processor) a workload monitoring algorithm, such as via the workload monitor 314, to perform the functions described herein. An example of an algorithm is provided below, where:

TR=Total used up resource at run time;
Max=Maximum number of available resource (e.g. a constant amount);
Index 1=Current Actuator index;
Index 2=Other Actuator index;
IR=Individual actuator used up resource;
D=Resource set aside for other actuator which is idle or working on unalike workload;
TR=IR [Index1]+IR [Index2];
If (TR<Max)//Check for the available resources
{
  if (IR [Index1]<(Max/2))//check for quota limit
  {
    Resource given to the current actuator
  }
  else if ((IR [Index2]==0) && (IR [Index1]<(Max−D)))//Check for other actuator's resource usage
  {
    Resource given to the current actuator
  }
}

This algorithm can be implemented by a workload monitor module to determine when an actuator needs more resources. Such an algorithm, as well as the other methods discussed herein, can easily be extended to any number of actuator systems. Though this disclosure mostly discusses dual actuator systems, the concepts herein can easily be extended to apply in multi-actuator technology with more than two actuators. In some embodiments, the methods disclosed herein can be applied to allocate NVC resources in a write cache disabled mode with a workload advisor, and in some embodiments does not need a timer. The methods can also be applied to allocating shared resources like DRAM, power, disc nodes and computation-power besides NVC in multi-actuators system. Further, the methods can be extended to other resources as well, such as overall power consumed. For example, if one of the actuators is idle, the other actuator with an active workload can use a more aggressive seek profile (e.g., a faster seek time or a change to the rotational latency) to improve performance, which, in some examples, can be accomplished by providing a higher amount of a power resource to a selected VCM actuator as well as adjusting a disc scheduling algorithm based on seek time and rotational latency.

Figure 4:
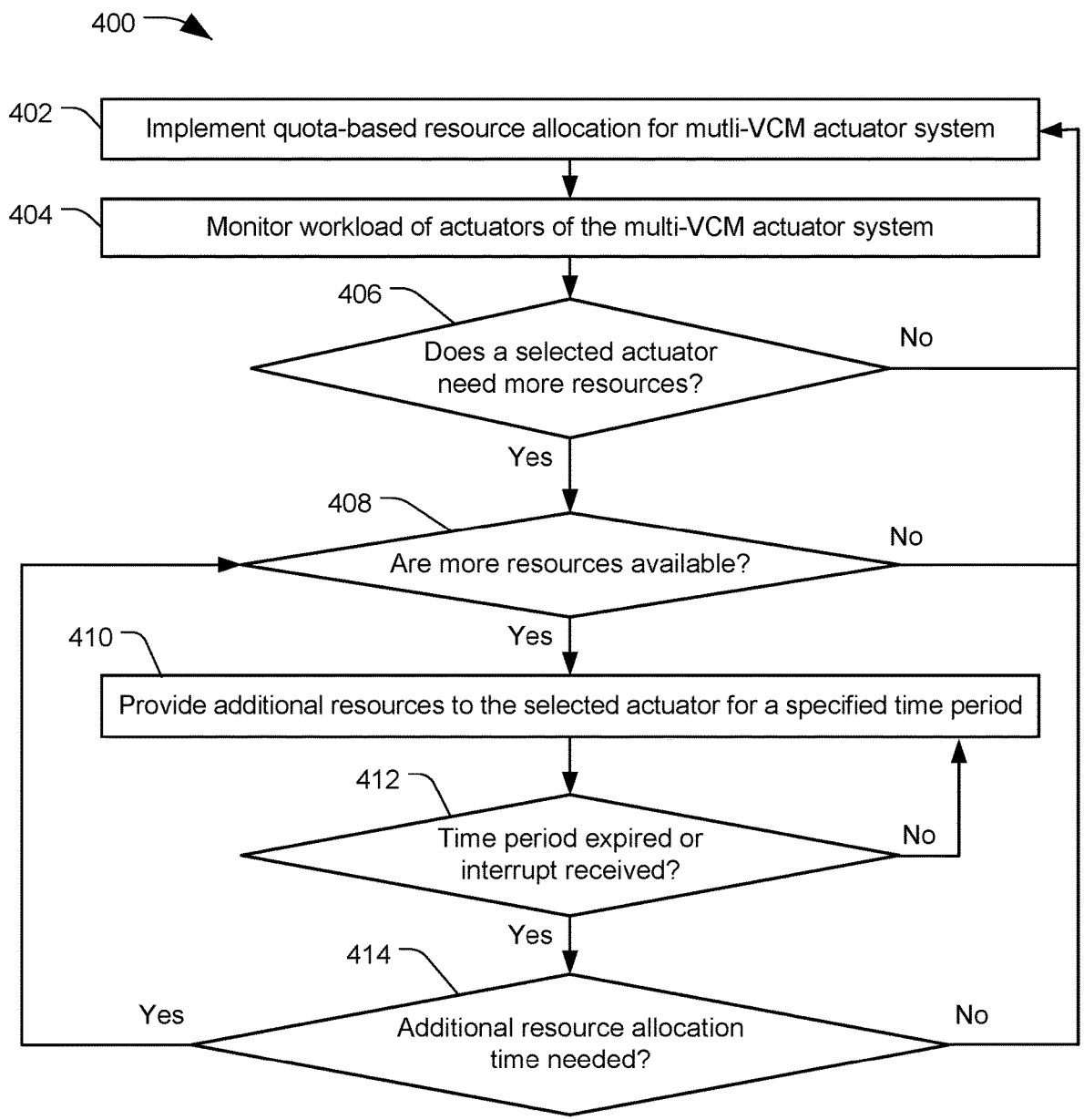
FIG. 4 depicts a flowchart of an example method for resource allocation for multi-actuator storage device, in accordance with certain embodiments of the present disclosure.

FIG. 4 depicts a flowchart of an example method for resource allocation for multi-actuator storage device, generally designated 400, in accordance with certain embodiments of the present disclosure. The method 400 may be implemented via the systems 100, 200, or 300. For example, the method 400 may be implemented as firmware in the controller 106, the servo control circuit 120, another circuit, or a combination thereof to allocate resources for actuator arms 202 and 204. In some embodiments, the method 400 may be implemented by AAM 312 and the modules associated therewith.

During operation of a data storage device with multiple VCM actuators, a quota-based resource allocation may be implemented, at 402. For example, each actuator may be assigned a quota of shared resources available such that during operation of a specific VCM actuator that specific VCM actuator may not utilize more resources than the assigned quota allows. Such assignment may be pre-determined or may be performed on-the-fly via a controller including a resource allocator module.

A workload monitor, such as workload monitor 314, may monitor workloads of the multiple actuators, at 404. In some examples, the workload monitor can examine command queues and related functions, as described herein (e.g., resource or workload monitoring as described in para. 0024 or 0032). When the workload monitor determines a selected actuator needs more resources, at 406 (e.g. such as via the algorithm discussed above), the method 400 may also determine if more resources are available, at 408 (e.g. such as via the algorithm discussed above). When an actuator does not need more resources or there are no extra resources available, the method may not implement the advanced resource sharing but may continue the quota-based resource sharing and continue workload monitoring, at 402 and 404, respectively.

In some embodiments, the workload monitor may monitor a memories queue depth; for example, by determining how many pending commands are scheduled for each actuator. Most pending commands are expected to be read or write commands that are associated with specific logical block address (LBA) ranges, which would then correlate to specific physical locations on disc surfaces associated with a specific head and, thus, a specific VCM actuator that moves that specific head to the physical location. By determining a depth of the queued commands per actuator, a workload monitor can determine when resources are available, when a particular actuator may need more resources, or both. Further, the workload monitor may determine workload based on a type of command received, the type of operations involved to execute the command, or both. For example, in data storage device that has a section of storage that has shingled tracks, such as a media cache, writing a streaming video to such may take less resources than writing random writes with many seeks. Thus, resources could be adjusted between actuators to compensate for a type of command or a number of seeks needed to be done to execute the underlying operations. In another example, writing a single track in the middle of a shingled storage area may benefit from having additional resources to perform the write than a short write to random access location.

When there are resources available, at 408, the method 400 may provide the additional resources to the selected actuator, at 410. In some embodiments, the resources can be provided for a specified or pre-determined time period. The method 400 may then determine if the limited time period has expired, at 412, and when the time period has expired may determine if an additional resource allocation is needed, at 414, such as providing an additional time period.

Additional resource allocation may be determined, at 414, as discussed herein. For example, a workload monitor may determine additional resources are still needed by a specific actuator or a processor associated with a specific actuator may request additional resources from a resource allocator, or any combination thereof.

Further, the method 400 may be configured to allow the advanced resource sharing to be interrupted, at 412. Such can include a processor associated with a different actuator sending an interrupt command or signal to the workload monitor or resource allocator to indicate the loaned-out resources are needed back. The selected actuator utilizing the loaned-out resources may speed up processing of its operations to finish faster to release the resources as soon as possible. In some examples, if the selected actuator utilizing the loaned-out resources cannot speed up completion of operations, it can at least be blocked from or stop using the additional resources for new operations; for example, if it got 25% more DRAM queue space, it may not add new commands to its queue until it works through the list of pending commands down to or below its original queue allotment.

Further, the systems and methods herein may implement a reserved resource amount that the loaned-out resource cannot borrow from (e.g., "D" in the algorithm presented above), thus, allowing an actuator from which resources were borrowed to function at a reduced resource level rather than being idle while the loaned-out resource(s) are not usable by the actuator. Thus, in some examples, a maximum amount of a resource that may be loaned out can be a maximum available resource amount less the reserved resource amount.

When no additional resource allocation is needed, at 414, the method 400 may reimplement the quota-based resource management policy and continue workload monitoring, at 402 and 404, respectively.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a first VCM actuator;
a second VCM actuator independently moveable from the first VCM actuator;
a control system coupled to the first VCM actuator and the second VCM actuator and configured to:
monitor a first resource usage of the first VCM actuator;
monitor a second resource usage of the second VCM actuator;
implement a quota based resource management policy for determining an allocation of an additional resource to one of the first VCM actuator and the second VCM actuator;
provide the additional resource to a selected one of the first VCM actuator and the second VCM actuator based on the first resource usage, the second resource usage, and the quota based resource management policy; and
operate the selected VCM actuator utilizing the additional resource.

2. The apparatus of claim 1 further comprising the control system configured to:
implement, prior to monitoring the first resource usage, the quota based resource management policy for each of the first VCM actuator and the second VCM actuator where each actuator is not allowed to utilize more resources than their respective allotted quota during implementation of the quota based resource management policy; and
stop implementing the quota based resource management policy when the control system determines the additional resource is needed at one of the first VCM actuator and the second VCM actuator.

3. The apparatus of claim 2 further comprising the control system configured to reimplement the quota based resource management policy when the additional resource is no longer needed.

4. The apparatus of claim 2 further comprising the control system further configured to reimplement the quota based resource management policy when a time limit has expired.

5. The apparatus of claim 1 further comprising:
an interface configured to be coupled to a host computer and send and receive data to and from the host computer;
a disc data storage device having multiple disc surfaces to store the data on;
the first VCM actuator configured to move a first read/write head in relation to a first disc surface; and
the second VCM actuator configured to move a second read/write head in relation to a second disc surface.

6. The apparatus of claim 5 further comprising the first VCM actuator is stacked vertically above the second VCM actuator on a common shaft and both VCM actuators are rotatable around a same axis.

7. The apparatus of claim 1 further comprising the control system configured to:
determine if the additional resource is available; and
provide the additional resource to the selected VCM actuator when the resource is available.

8. The apparatus of claim 7 further comprising the additional resource includes at least one resource from the group consisting of: volatile memory space, non-volatile solid state memory space, CPU processing, and power consumption.

9. The apparatus of claim 7 further comprising the control system configured to provide the additional resource to the selected VCM actuator for a limited period of time.

10. The apparatus of claim 9 further comprising the control system configured to provide an additional time period, beyond the limited period of time, for the additional resource to be provided to the selected VCM actuator.

11. An apparatus comprising:
a control circuit configured to be coupled to a first voice coil motor (VCM) actuator and a second VCM actuator, the control circuit further configured to:
monitor a first resource usage of the first VCM actuator;
monitor a second resource usage of the second VCM actuator;
provide an additional resource to a selected one of the first VCM actuator and the second VCM actuator when the first resource usage in addition to the second resource usage is less than a maximum amount available for the additional resource; and
operate the selected VCM actuator utilizing the additional resource.

12. The apparatus of claim 11 further comprising the control circuit configured to provide an amount of the additional resource to the selected VCM actuator up to the maximum amount available less a reserve amount for the non-selected VCM actuator.

13. The apparatus of claim 11 further comprising the control circuit configured to:
implement, prior to monitoring the first resource usage, a quota based resource management policy for each of the first VCM actuator and the second VCM actuator where each actuator is not allowed to utilize more resources than their respective allotted quota during implementation of the quota based resource management policy; and
stop implementing the quota based resource management policy when the control circuit determines the additional resource can be utilized at one of the first VCM actuator and the second VCM actuator.

14. The apparatus of claim 11 further comprising the control system configured to provide the additional resource to the selected VCM actuator for a limited period of time.

15. The apparatus of claim 11 further comprising:
an interface configured to be coupled to a host computer and send and receive data to and from the host computer;
a disc data storage device having multiple disc surfaces to store the data on;
the first VCM actuator configured to move a first read/write head in relation to a first disc surface;
the second VCM actuator configured to move a second read/write head in relation to a second disc surface; and
the first VCM actuator is stacked vertically above the second VCM actuator on a common shaft such that both VCM actuators are rotatable around a same axis.

16. A memory device storing instructions that when executed cause a processor to perform a method comprising:
implementing a quota based resource allocation for a first voice coil motor (VCM) actuator and a second voice coil motor (VCM) actuator;
monitoring a first resource usage of the first VCM actuator;
monitoring a second resource usage of the second VCM actuator;
providing an additional resource to a selected one of the first VCM actuator and the second VCM actuator based on the first resource usage and the second resource usage, the additional resource providing a resource usage capability above an assigned quota for the selected VCM actuator; and operating the selected VCM actuator utilizing the additional resource.

17. The memory device of claim 16 further comprising the method further including:

implementing, prior to monitoring the first resource usage, the quota based resource management policy for each of the first VCM actuator and the second VCM actuator where each actuator is not allowed to utilize more resources than their respective allotted quota during implementation of the quota based resource management policy; and stop implementing the quota based resource management policy when the additional resource can be utilized at one of the first VCM actuator and the second VCM actuator.

18. The memory device of claim 16 further comprising the method further including:

determining if the additional resource is available; and providing the additional resource to the selected VCM actuator when the resource is available.

19. The memory device of claim 16 further comprising the method further including:

providing the additional resource to the selected VCM actuator for a limited period of time; and providing an additional time period, beyond the limited period of time, for the additional resource to be provided to the selected VCM actuator.

* * * * *